(12) United States Patent
Crowell

(10) Patent No.: US 9,645,272 B2
(45) Date of Patent: May 9, 2017

(54) METHOD AND APPARATUS FOR SYNCHRONIZING CLOCKS UNDERWATER USING LIGHT AND SOUND

(71) Applicant: TRACKSERVER, INC., Fall River, MA (US)

(72) Inventor: Jonathan C. Crowell, Dorchester, MA (US)

(73) Assignee: OceanServer Technology, Inc., Fall River, MA (US)

( * ) Notice: Subject to any disclaimer, the term of this patent is extended or adjusted under 35 U.S.C. 154(b) by 0 days.

(21) Appl. No.: 14/588,558

(22) Filed: Jan. 2, 2015

(65) Prior Publication Data

US 2015/0188695 A1     Jul. 2, 2015

Related U.S. Application Data

(60) Provisional application No. 61/922,909, filed on Jan. 2, 2014.

(51) Int. Cl.
*G04G 7/00*     (2006.01)
*H04B 11/00*     (2006.01)
(Continued)

(52) U.S. Cl.
CPC ............ *G01V 1/3852* (2013.01); *G04C 11/00* (2013.01); *G04G 7/00* (2013.01); *H04B 11/00* (2013.01); *G01V 2200/12* (2013.01)

(58) Field of Classification Search
CPC combination set(s) only.
See application file for complete search history.

(56) References Cited

U.S. PATENT DOCUMENTS 3,722,258 A    3/1973    Besson et al.
3,789,653 A    2/1974    Brejaud
(Continued)

FOREIGN PATENT DOCUMENTS

CN    102970094 A    3/2013
CN    202906946 U    4/2013
(Continued)

OTHER PUBLICATIONS

Vasilescu K. Kotay, Data Collection, Storage, and Retrieval with an Underwater Sensor Network—Sensys'05, Nov. 2-4, 2005, pp. 1-12.*

(Continued)

*Primary Examiner* — David Payne
*Assistant Examiner* — Omar S Ismail
(74) *Attorney, Agent, or Firm* — Nutter McClennen & Fish LLP

(57) ABSTRACT

Methods and systems for synchronizing clocks used in underwater devices is described. All clocks have some drift due to frequency accuracy and this disclosure provides a method for periodically synchronizing clocks to an accurate master clock to remove long term drift. A synchronization device can use an accurate clock and hardware to transmit both a sound wave and light pulse at the same point in time. Remote slave clocks can detect the light first, and later the sound, allowing them to calculate the distance the pulse had to travel. The clocks can then synchronize their time to the master clock canceling out any drift. The synchronization device can be packaged in a waterproof housing and can be moved around on a periodic basis between the clock on an underwater robot or any other means.

18 Claims, 2 Drawing Sheets

(51) Int. Cl.
  *G04C 11/00* (2006.01)
  *G01V 1/38* (2006.01)

(56) References Cited

U.S. PATENT DOCUMENTS

| | | | |
|---|---|---|---|
| 4,800,541 A | 1/1989 | Farmer et al. | |
| 5,119,341 A | 6/1992 | Youngberg | |
| 5,583,824 A * | 12/1996 | Fletcher | G01V 1/22 367/21 |
| 7,953,326 B2 | 5/2011 | Farr et al. | |
| 8,009,516 B2 | 8/2011 | Crowell | |
| 2005/0219950 A1 * | 10/2005 | Rowe | G01S 5/0226 367/118 |
| 2006/0239121 A1 * | 10/2006 | Kong | G01S 11/16 367/128 |
| 2008/0024355 A1 | 1/2008 | Sun et al. | |
| 2010/0278014 A1 | 11/2010 | Rhodes et al. | |
| 2011/0038230 A1 * | 2/2011 | Napolitano | G01S 1/80 367/127 |
| 2011/0202278 A1 * | 8/2011 | Caute | G01S 7/003 702/14 |
| 2012/0170935 A1 * | 7/2012 | Machado | H04B 13/02 398/58 |

FOREIGN PATENT DOCUMENTS

| | | |
|---|---|---|
| EP | 2469361 A1 | 6/2012 |
| WO | 2012/082508 A1 | 6/2012 |
| WO | WO 2015103464 A1 * | 7/2015 ............ G04C 11/00 |

OTHER PUBLICATIONS

I. Vasilescu, K. Kotay,Data Collection, Storage, and Retrieval with an Underwater Sensor Network,SenSys'05, Nov. 2-4, 2005,San Diego, California, USA,pp. 1-12.*

[No Author Listed] "An Overview of Marine Seismic Operations," International Association of Geophysical Contractors Report No. 448; Apr. 2011; http://www.ogp.org.uk/pubs/448.pdf.

International Search Report and Written Opinion for Application No. PCT/US15/10025, mailed Apr. 28, 2015. (8 pages).

\* cited by examiner

METHOD AND APPARATUS FOR SYNCHRONIZING CLOCKS UNDERWATER USING LIGHT AND SOUND

RELATED APPLICATIONS

This application claims priority under 35 U.S.C. §119(e) to U.S. Provisional Patent Application No. 61/922,909, entitled Method and Apparatus for Synchronizing Clocks Underwater Using Light and Sound, and filed on Jan. 2, 2014, the contents of which are incorporated herein by reference.

BACKGROUND

There are many devices used underwater that require accurate synchronized clocks. One example, described in U.S. Pat. No. 8,009,516, entitled "Underwater Acoustic Positioning System and Method and Underwater," the teachings of which are incorporated herein in their entirety, requires all devices to have accurate synchronized time in order for an autonomous underwater vehicle to be able to precisely determine its position underwater. A further example includes underwater seismic arrays that have thousands of recorders spread on the seafloor logging the echo data from common sound waves bouncing off rock layers under the seabed. These systems are typically synchronized to the GPS Atomic clock using the PPS output of GPS receivers in air. Underwater radio waves at these frequencies can't propagate any useful distance.

There are very small oscillators with varying degrees of accuracy that have lower and lower levels of drift correlated with increasing cost. These form the basis for timing in clocks by counting the cycles of oscillation. Table 1 below provides examples of conventional parts illustrating the clock accuracy in parts per billion and the resulting error in meters of sound travel. One design goal could be to have no more than 0.2M of sound travel error induced by the timing. The $100 oscillator would be within this specification for 4 hours while the $2000 atomic clock oscillator will be in specification for 941 hours.

TABLE 1

| Oscillator | Frequency Accuracy in ppb | Approx cost in USD | Clock Drift in 24 hours | Sound Travel Distance |
|---|---|---|---|---|
| ASV-10.000MHZ-E-T | 100000 | $ 1 | 8640 ms | 12,900 M |
| DV75D-010.0M | 1000 | $ 10 | 86.4 ms | 129 M |
| OH300-61003CV-010.0M | 10 | $ 100 | 0.864 ms | 1.2 M |
| SA.45 Chip Scale Atomic Clock | 0.04 | $2000 | 0.0034 ms | 0.0051 M |

If a simple and effective method were available to synchronize these clocks every four hours, the $100 oscillator could operate within specification for as long as desired. This can be compared to operation of the $2000 atomic clock without such a method, which will drift out of specification after 941 hours. The method would thus allow the less expensive oscillator to provide the required accuracy—a significant advantage where many clocked devices are required.

In another way to look at the problem, deployment of the $2000 clocks with synchronization every 4 hours can limit the drift to 56 micro seconds for as long as desired. A practical example would be a system based on U.S. Pat. No. 8,009,516 where station keeping beacons are mounted permanently across a harbor as a full time navigation resource, they can be battery powered and can use the SA.45 atomic clocks. Synchronization once every 2 weeks would limit the time error in distance to about 7 cm. This could provide a practical way to place a multitude of standalone battery powered devices for use as permanent underwater GPS like facility.

SUMMARY

The invention relates to the synchronization of one or more slave clock devices from a master clock device. In a first aspect, a system is provided for keeping synchronized time underwater. The system includes a master clock device including a master clock and a light transmitter and a slave clock device including a slave clock, a light receiver, and a computing device implementing logic for adjusting the slave clock. The logic includes:

i. determining a distance between the master clock device and the slave clock device;

ii. calculating, based upon the distance between the master clock device and the slave clock device a time at which a light pulse transmitted from the master clock device is received by the slave clock device, the time at which the light pulse was transmitted from the master clock device; and iii. applying a time offset to the slave clock based upon a difference between the time that the light pulse was transmitted according to the master clock and the calculated light pulse transmission time calculated at the slave clock device.

In a further aspect, a system is provided for keeping synchronized time underwater. This system includes a master clock device including a master clock, a light transmitter, and a sound transmitter. The system further includes a slave clock device including a slave clock, a light receiver, a sound receiver, and a computing device implementing logic for adjusting the slave clock. The logic includes:

i. calculating, based upon the difference in arrival times of the light pulse and the sound pulse, a distance between the master clock device and the slave clock device;

ii. calculating, based upon the distance between the master clock device and the slave clock device, the time at which the light pulse was transmitted from the master clock device; and iii. applying a time offset to the slave clock based upon a difference between the time that the light pulse was transmitted according to the master clock and the calculated light pulse transmission time calculated at the slave clock device.

In a still further aspect, a method is provided for synchronizing underwater slave clock devices from a master clock device wirelessly. The method includes transmitting from the master clock device a light pulse and a sound pulse and receiving at a slave clock device the light pulse and the sound pulse. A distance between the master clock device and the slave clock device is calculated at the slave clock device based upon the difference in arrival times of the light pulse and the sound pulse. The time at which the light pulse was transmitted from the master clock device is calculated at the slave clock device based upon the distance between the master clock device and the slave clock device. A time offset is then applied at the slave clock device to a clock on the slave clock device based upon a difference between the time that the light pulse was transmitted according to a clock on the master clock device and the calculated light pulse transmission time calculated at the slave clock device.

DETAILED DESCRIPTION

Systems and methods of the invention use a light pulse to signal a synchronization event between a master clock and one or more slave clocks. Because the light pulse takes some time to transit between the master and slave clocks, the transit time could introduce an error in the synchronization of the clocks if it is not accounted for. Knowing the distance between the master and slave clocks at the time of the transmission of the light pulse can allow for calculation of the transit time of the pulse, with the result being a very accurate synchronization pulse.

Because light travels very fast and sound very slowly, one can measure the time between arrival of light and sound pulses that have been transmitted from the same place at the same time (the time difference of arrival of the pulses) and accurately know the distance of the remote transmitters at the master clock. Sound travels at approximately 1500 m/s in water and light travels around $2.25 \times 10^8$ m/s. Measuring the time difference between the light and sound arrival allows solving for the distance. The distance method is similar to that of seeing a lightning flash and counting the seconds for boom to arrive.

The details of the distance calculation are shown below. The distance from the master clock to the slave clock is approximately the DeltaTime*sound speed.

$$Time_{LIGHT} = d \text{ (m)}/2.25e8 \text{ (m/s)}$$

$$Time_{SOUND} = d \text{ (m)}/1500 \text{ (m/s)}$$

$$DeltaTime = Time_{sound} - Time_{LIGHT} // \text{Measured as the difference in arrival times.}$$

$$Distance = DeltaTime*(1500-2.25E-8) = DeltaTime*1500.000000004$$

$$LightTravelTime = Distance/2.25e8$$

Figure 1:
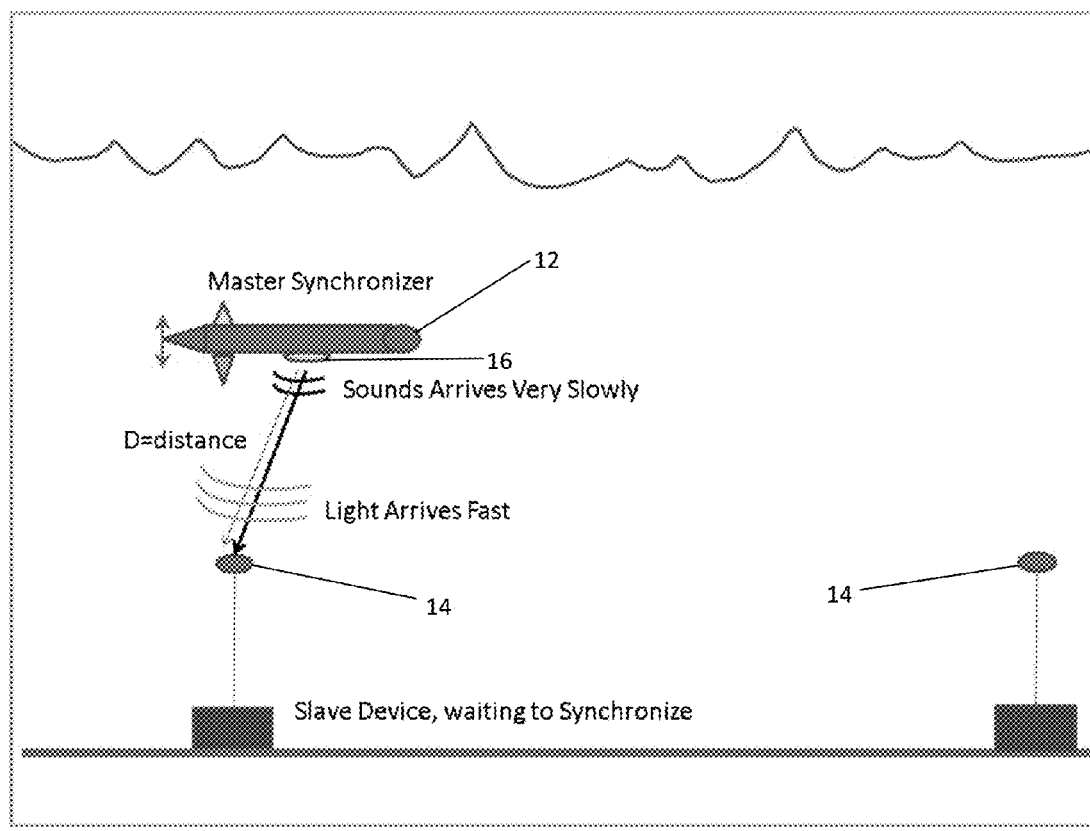
FIG. 1 provides an illustration of a system of the invention.

A system for synchronizing slave clocks can be illustrated with respect to FIG. 1 below. In the Figure, a Master Synchronizer 12 synchronizes two Slave Devices 14. A synchronization device 16 is located on the Master Synchronizer—in this case, an Autonomous Underwater Vehicle (AUV), also referred to herein as a robot. The synchronization device 16 includes a clock and can deliver both a light pulse and a sound pulse. The clock in the synchronization device can be synchronized to, for example, a GPS time signal. Slave Devices 14, devices having slave clocks, are fixed to the sea floor and wait for the robot to pass within range.

A method for synchronizing each of the slave clocks can proceed as follows: First, a passing robot can transmit a light and sound burst at a known or predetermined time. The time can be scheduled on a schedule that is known to both the master synchronizer and slave clocks. Such a scheduled time can be a simple, recurring time, such as, for example, the top of every second. For the remaining examples described herein, it will be assumed that the master transmits at the top of each second.

Next, when a slave device receives the light pulse, it records its arrival time ($Time_{LIGHT}$) using it's onboard clock. When the slave device then receives the sound pulse, it records it's time ($Time_{SOUND}$) using its onboard clock.

In a further step in the method, using the time difference of arrival calculations described above, the slave device finds distance to robot at the time that the pulse was transmitted. Once the distance is found, the slave device can determine the time of transit for the light pulse from the master to the slave.

Still further, the clock error on this slave device can be calculated as $Time_{LIGHT}$−LightTravelTime (the time variance from the top of the second). The slave device clock can then be adjusted by this amount and be back in synchronization with GPS UTC Atomic time.

A more specific example will now be described: A light pulse is received at a local clock on a slave device that is 950 ns slow with respect to the top of a second. The light and sound pulses from the master arrive 0.010 seconds apart, the distance of the robot sending the pulse is 0.010*1500=15 Meters away. So the pulse of light used to synchronize the clocks arrived 15 meters of light travel late or, 15/2.25e8=66.6 ns. So the clock needs to have 66.6 ns subtracted from its time adjustment to account for the travel time. Accordingly, the local clock needs an adjustment of +950−66.6=883.4 ns to match the accurate master clock on the passing AUV.

The slave device can include a stable clock such as an OvenStabilized Oscillator or a chip scale atomic clock, such as the Symetricon SA.45, available from Microsemi Corporation of San Jose, Calif. This clock can run the timing on the slave system, typically by being the clock to a microprocessor such as the C8051F121 from Silicon Laboratories, Inc. of Austin, Tex., running at 100 Mhz, 10 ns ticks. The slave device can calculate its time error from the timing of the pulses from the master robot. The slave device will then adjust its TIMEOFDAY clock by the calculated offset. In addition, the oscillators can allow can allow for a trim value to slow down or speed up the local oscillator by a very small trim amount. This can be added when the time is adjusted to the clock is trained to cancel out ageing effects and run more accurately.

Logic for performing these calculations can be performed on a computing device such as the microprocessor referenced above. Such computing devices may also include, but are not limited to, a device having one or more processors and memory for executing and storing instructions. Such a computing device may include software (not including transitory signals), firmware, and/or hardware. Software may include one or more applications and an operating system. Hardware can include, but is not limited to, a processor, memory, and hardware for interfacing with the computing device for loading instructions onto the computing device. Hardware can also include application specific circuitry for implementing the logic, such as ASICs.

The generation of the light pulse can be done in such a way as to be very bright and synchronized to the master clock's synch event (e.g., the top of the second) such as GPS PPS. The fixed time to send the signal from the clock event to the light source can be removed by advancing the time the trigger is generated so the light pulse is exactly at the clock synchronization event. The maximum light pulse propagation distance is based on the clarity of the water. In the preferred embodiment an autonomous underwater vehicle (AUV) is used to carry the master synchronizer. In general, an AUV can pass within several meters of unit to be calibrated in case the water is turbid and has very limited light transmission distances. The LED's in 6000K white lights travel well in water and the duration of the pulse can be very small so as to not use too much energy. There are many light sensors that can convert a light pulse to an electrical signal very quickly.

The generation of sound happens more slowly as it requires a mechanical device, such as a piezo electric transducer, to start ringing. This happens much faster at higher frequencies, but the distance the signal can travel is much shorter in water. A sound pulse in the 200 Khz frequency range can easily travel 100 meters with sufficient energy for detection by the slave device. The trigger pulse could be generated ahead of the time to cancel out the fixed time needed to start the transducer ringing and it may take 2 cycles to detect the signal on the slave device. This could be several microseconds, but it only adds thousands of a meter to the distance estimate of the master vehicle and the delay time error is very small. The Analog Devices AD8310 can detect the analog signal in 1 cycle+15 ns and provide a trigger signal to the timing circuit. Higher frequencies reduce the error of 1 cycle based on the wavelength of the sound.

The master clock on the robot could be the Symetricon SA.45 chip scale atomic clock. It can be synchronized to the GPS atomic time when the master robot is on the surface. The GPS PPS signal is accurate to a few nanoseconds. The robot could return the surface as required to re-synchronize/train its atomic clock to reduce the errors with the GPS UTC atomic time.

In areas where the water is shallow and clear enough for light to travel from the surface to slave devices, a surface vessel that travels above the slave devices could carry the synchronization device and send the sound and light signal pairs based on an onboard system which could be the PPS signal from a GPS device. In a further embodiment, a tow fish attached to a surface ship could be towed at a depth that would allow it to send the signals. A trigger pulse could be advanced to send the pulse early and cancel out the delay of the known length tow cable.

In a further embodiment, both master and slave devices could include a light or acoustic transmitter and receiver. This would allow two way data communication to send information beyond the synchronization event. This could include transmitting information regarding UTC time and how the synchronization event is defined. Information exchanged could also include UTC time/date and/or the time at which the pulse was or will be transmitted. Other data could be exchanged such as synchronization event successful messages, clock drift at time of corrections, battery state, etc.

This invention can be applied to the underwater positioning system described in U.S. Pat. No. 8,009,516. The underwater positioning system would provide each device with its location to a very high degree of accuracy and the clock synchronization scheme would allow it to have high accuracy synchronized time. The master synchronization device could use the underwater positioning system to swim by all of the underwater devices having slave clocks at very close range with high degree of accuracy. In this mode the system could operate with just a light flash as the synchronizing event as the system could be programmed to flash only when the master device is in a known location and distance from the slave clock. The offset could then be calculated based on a predetermined transmit time, the known distance, and the measured receipt time.

One possible application would be for a combined system of that in U.S. Pat. No. 8,009,516 where the device can deduce its location from the buoy/beacons that transmit the locator acoustic pulses. The combined device could then know it's location from ranging off the beacons and could have their time updated along with the beacons/buoys. The master could synchronize the time of the slave devices as well as collect large amounts of data using an optical modem when the AUV is near the slave system. This package could be added to seismic data collector systems to replace the need for cables. The devices could take commands and release anchors to float to the surface for recovery. The data needs synchronized clocks and very accurate position information for reconstructing the data.

Information on the operation of seismic data collector systems can be found in "An overview of marine seismic operations" from the International Association of Geophysical Contractors Report No. 448 published in April of 2011 at http://www.ogp.org.uk/pubs/448.pdf, the contents of which are incorporated by reference herein in their entirety.

Figure 2:
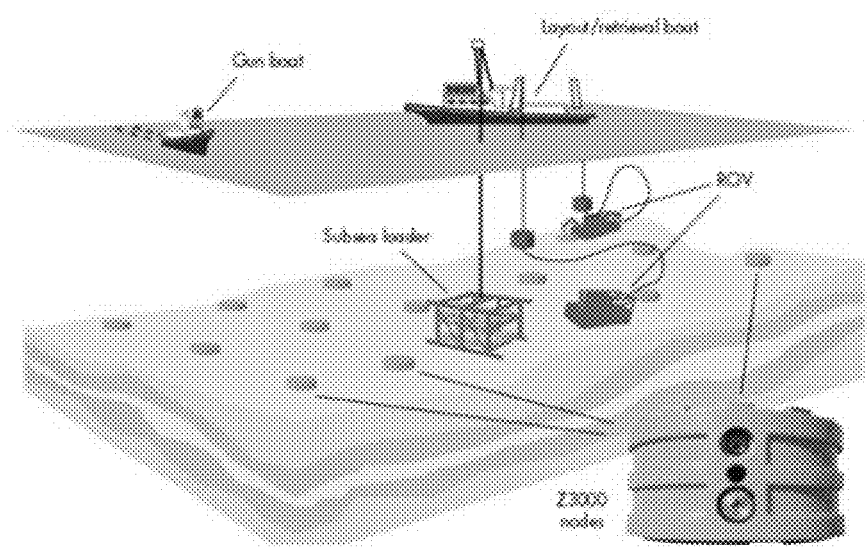
FIG. 2 provides an illustration of an underwater seismic data collector system with which the invention can be used.

An example of such a seismic system is illustrated in FIG. 2. There, subsea sensor nodes (identified as Z3000 nodes) record a variety of sensed data over time. The system of the invention could be employed with these nodes as the slave devices so as to keep their internal clocks synchronized while eliminating the need for the sensors to be cabled (especially where the master device can also download data from the sensors.

Although a few exemplary implementations have been described in detail above, other modifications are possible. Moreover, other mechanisms for performing the systems and methods described herein may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims. In addition, a number of references are identified following the claims. Each of these references may relate to the field of the invention. Each of these references is incorporated herein in their entirety, and elements of these references may be combined with the elements of the invention as described above.

The invention claimed is:

1. A method for synchronizing underwater slave clock devices from a master clock device wirelessly, comprising:
    transmitting from the master clock device a light pulse and a sound pulse;
    receiving at a slave clock device the light pulse and the sound pulse;
    calculating at the slave clock device, based upon the difference in arrival times of the light pulse and the sound pulse, a distance between the master clock device and the slave clock device;
    calculating at the slave clock device, based upon the distance between the master clock device and the slave clock device, the time at which the light pulse was transmitted from the master clock device;
    applying at the slave clock device a time offset to a clock on the slave clock device based upon a difference between the time that the light pulse was transmitted according to a clock on the master clock device and the calculated light pulse transmission time calculated at the slave clock device.

2. The method of claim 1, wherein light pulses can be sent and received by both the master and slave clock devices for two way transmission of digital data between the master and slave clock devices.

3. The method of claim 1, wherein sound pulses can be sent and received by both the master and slave clock devices for two way transmission of digital data between the master and slave clock devices.

4. The method of claim 1, wherein the master clock device includes logic for synchronizing the master clock to the GPS atomic clock when the master clock device is located so as to receive GPS signals.

5. The method of claim 1, wherein the master clock device is located on an autonomous underwater vehicle.

6. A system for keeping synchronized time underwater comprising:
   a master clock device including a master clock, a light transmitter, and a sound transmitter;
   a slave clock device including a slave clock, a light receiver, a sound receiver, and a computing device implementing logic for adjusting the slave clock, the logic:
   i. calculating, based upon the difference in arrival times of the light pulse and the sound pulse, a distance between the master clock device and the slave clock device;
   ii. calculating, based upon the distance between the master clock device and the slave clock device, the time at which the light pulse was transmitted from the master clock device; and
   iii. applying a time offset to the slave clock based upon a difference between the time that the light pulse was transmitted according to the master clock and the calculated light pulse transmission time calculated at the slave clock device.

7. The system of claim 6, wherein light pulses can be sent and received by both the master and slave clock devices for two way transmission of digital data between the master and slave clock devices.

8. The system of claim 6, wherein sound pulses can be sent and received by both the master and slave clock devices for two way transmission of digital data between the master and slave clock devices.

9. The system of claim 6, wherein the master clock device includes logic for synchronizing the master clock to the GPS atomic clock when the master clock device is located so as to receive GPS signals.

10. The system of claim 6, wherein the master clock device is located on an autonomous underwater vehicle.

11. A system for keeping synchronized time underwater comprising:
   a master clock device including a master clock and a light transmitter;
   a slave clock device including a slave clock, a light receiver, and a computing device implementing logic for adjusting the slave clock, the logic:
   i. determining a distance between the master clock device and the slave clock device;
   ii. calculating, based upon the distance between the master clock device and the slave clock device a time at which a light pulse transmitted from the master clock device is received by the slave clock device, the time at which the light pulse was transmitted from the master clock device; and
   iii. applying a time offset to the slave clock based upon a difference between the time that the light pulse was transmitted according to the master clock and the calculated light pulse transmission time calculated at the slave clock device.

12. The method of claim 1, wherein the master clock device transmits the light pulse and the sound pulse at the same time.

13. The method of claim 12, wherein the master clock device transmits the light pulse and the sound pulse at the same predetermined time.

14. The method of claim 13, wherein the predetermined time is scheduled according to a schedule that is known to both the master clock device and the slave clock device.

15. The system of claim 6, wherein the master clock device transmits the light pulse and the sound pulse at the same time.

16. The system of claim 15, wherein the master clock device transmits the light pulse and the sound pulse at the same predetermined time.

17. The system of claim 16, wherein the predetermined time is scheduled according to a schedule that is known to both the master clock device and the slave clock device.

18. The system of claim 11, wherein the master clock device transmits the light pulse at a predetermined time according to a schedule that is known to both the master clock device and the slave clock device.

* * * * *